(No Model.)
R. P. SORRELS.
CANE STRIPPER.
No. 378,735. Patented Feb. 28, 1888.
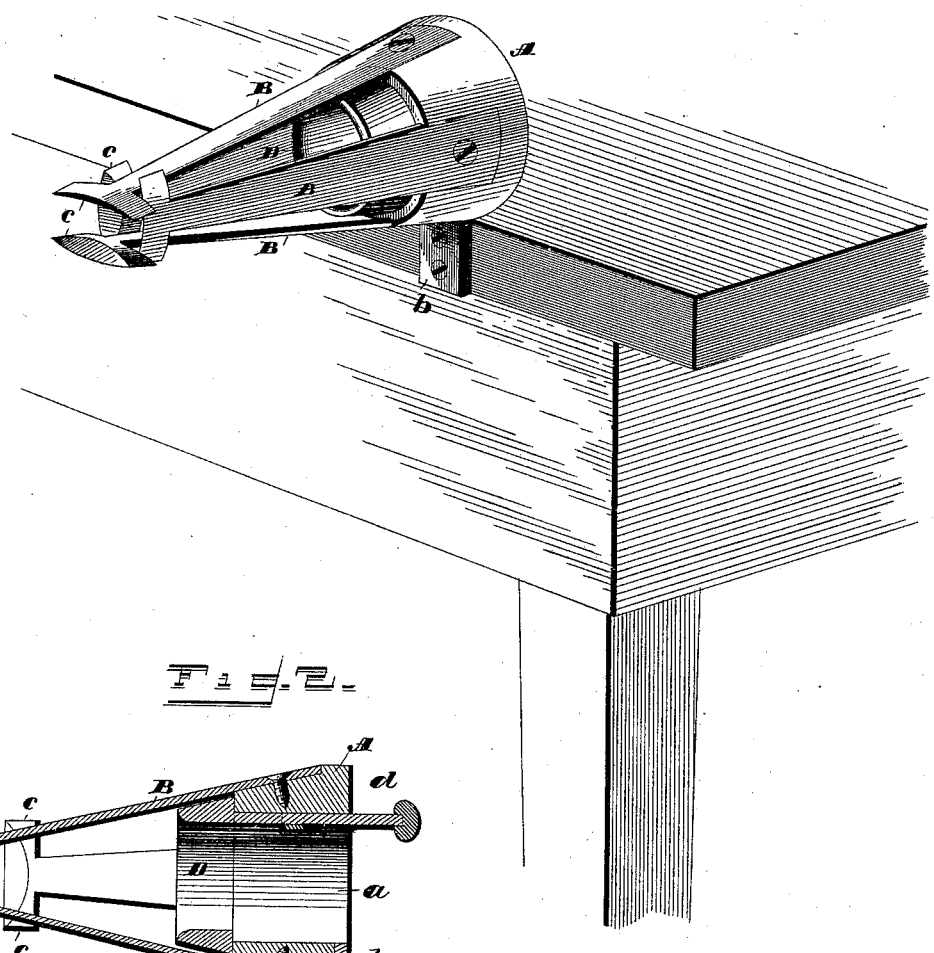
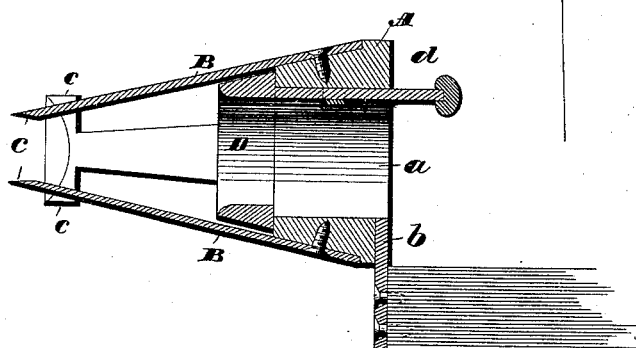
WITNESSES
G. S. Elliott,
C. M. Johnson
Richard P. Sorrels.
INVENTOR,
Attorney.

UNITED STATES PATENT OFFICE.

RICHARD P. SORRELS, OF HARTFORD, KENTUCKY.

CANE-STRIPPER.

SPECIFICATION forming part of Letters Patent No. 378,735, dated February 28, 1888.

Application filed September 10, 1887. Serial No. 249,404. (No model.)

*To all whom it may concern:*

Be it known that I, RICHARD P. SORRELS, a citizen of the United States of America, residing at Hartford, in the county of Ohio and State of Kentucky, have invented certain new and useful Improvements in Cane-Strippers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in cane-strippers, the object of my invention being to provide means whereby the stalk can be inserted between a series of knives or blades, so that when the stalks are drawn through the same the leaves and projecting portions will be removed and the stalk will be in a condition to be fed to the pressing-rollers.

My invention consists in the construction and combination of the parts, as will be hereinafter fully set forth, and specifically pointed out in the claim.

In the accompanying drawings, which illustrate my invention, Figure 1 is a perspective view of a device for removing leaves from stalks, the same being constructed in accordance with my improvements; and Fig. 2 is a longitudinal sectional view.

A refers to a band which is provided with a central opening, $a$, and with a portion, $b$, which is rigidly secured thereto and depends therefrom, so as to provide a means for attaching the band A to a table or other support.

The outer edge or periphery of the band A is preferably tapered and provided with a series of recesses, within which are secured, by means of suitable bolts or other fastening devices, spring blades or cutters B B. The spring blades or cutters B B gradually taper in width from the ring A, to which they are secured, outwardly, and they are provided at their outer ends with curved ends, which have laterally-projecting portions. The ends of the blades, which are curved and have these laterally-projecting portions $c$ $c$, are ground or sharpened so that the cutting-edges will be beveled, said bevel being toward a center located at a point between the knives, so that when the stalks are drawn between these cutting-edges they will not have a tendency to enter or be forced into the stalk, but will slide upon said stalk, so as to only remove any projecting portions therefrom.

If the knives were beveled otherwise than described, they would have a tendency to enter the stalk, so as to sever the same, or would cut deep gashes into it. The opposite blades, which are attached to the ring or support A, are of equal length, and a pair of said blades are of less length than the blades adjacent thereto. By thus arranging the blades I am enabled to provide the projecting portions $c$ $c$ thereof of a length sufficient to entirely encircle stalks of ordinary size.

Within the blades is placed a follower, D, which has a rearwardly-extending handle, $d$, which may be provided with a knob, as shown, and by pressing this follower D toward the ends of the blades said blades will be opened or separated from each other, so as to permit the stalk to be inserted. After the stalk is inserted and drawn between the knife-blades, frictional contact of said stalk upon the follower, as well as the spring-pressure of the blades, will cause the follower to be moved rearwardly.

In operating my invention the follower is pressed forwardly, which will cause the blades to be separated, and one end of the stalk is then inserted between the blades, and as the stalk is drawn rearwardly the follower will be brought against the front edge of the supporting-ring A and the blades will bear upon the outer edges of the stalk and will remove therefrom any projecting portions, as leaves or enlarged growth at the joints. The leaves and other material which may be removed from the stalk can be collected, in a basket or other suitable receptacle placed under the cutter, for use as fodder, while the stalks will be in a good condition to be fed to the rollers for extracting the juices therefrom.

As the blades B B are secured to the tapering edge of the band A, they gradually approach or converge toward each other at their outer ends.

I claim—

In a cane-stripper, the combination of a metallic support, A, constructed in the form of a frustum of a cone, having slots or recesses in its outer surface and formed with a central opening, a series of converging cutters removably secured in the slots or recesses in the outer surface of the support A at their inner ends, and having laterally-projecting cutter-heads c at their opposite ends, and a follower provided with an integral handle for separating the cutters, and also constructed in the form of a frustum of a cone and having an opening therein of less diameter than the opening in the support A to form a projecting rim of metal which bears against the support A when said follower is not in operation, substantially as described.

In testimony whereof I affix my signature in presence of two witnesses.

RICHARD P. SORRELS.

Witnesses:
J. P. SANDERSON,
W. P. MAXWELL.